United States Patent
Tsuzawa et al.

(10) Patent No.: US 8,505,746 B2
(45) Date of Patent: Aug. 13, 2013

(54) SEPARATION MEMBRANE COMPRISING POLYETHERSULFONE, PROCESS FOR PRODUCING THEREOF, AND DOPE SOLUTION FOR MEMBRANE PRODUCTION

(75) Inventors: Masaki Tsuzawa, Akashi (JP); Hideto Matsuyama, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 478 days.

(21) Appl. No.: 12/738,617

(22) PCT Filed: Sep. 30, 2008

(86) PCT No.: PCT/JP2008/002749
§ 371 (c)(1),
(2), (4) Date: Jul. 28, 2010

(87) PCT Pub. No.: WO2009/050850
PCT Pub. Date: Apr. 23, 2009

(65) Prior Publication Data
US 2010/0294713 A1    Nov. 25, 2010

(30) Foreign Application Priority Data
Oct. 19, 2007    (JP) ................................. 2007-272481

(51) Int. Cl.
*B01D 71/68* (2006.01)
*B01D 69/08* (2006.01)
*B01D 69/06* (2006.01)
*B01D 67/00* (2006.01)
*B01D 63/02* (2006.01)
*B01D 63/08* (2006.01)

(52) U.S. Cl.
CPC ............ *B01D 67/0011* (2013.01); *B01D 69/08* (2013.01); *B01D 63/021* (2013.01); *B01D 63/081* (2013.01); *B01D 67/0009* (2013.01); *B01D 67/0018* (2013.01); *B01D 67/0013* (2013.01); *B01D 69/06* (2013.01)
USPC ............ 210/500.41; 210/500.23; 210/500.21; 210/653; 427/244; 427/246

(58) Field of Classification Search
CPC .. B01D 63/023; B01D 63/021; B01D 63/081; B01D 67/0009; B01D 67/0011; B01D 67/0018; B01D 67/0013; B01D 69/08; B01D 69/06; D01F 1/08
USPC .............. 210/500.1, 500.21, 500.22, 500.23, 210/500.27, 500.28, 500.33, 500.36, 500.41, 210/506, 508, 321.78, 321.79, 321.8, 321.87, 210/321.88, 321.89, 323.2, 650, 651, 652, 210/653, 654; 427/243–246
See application file for complete search history.

(56) References Cited

U.S. PATENT DOCUMENTS

| | | | |
|---|---|---|---|
| 4,968,733 A * | 11/1990 | Muller et al. | 521/64 |
| 5,073,455 A * | 12/1991 | Nose et al. | 428/411.1 |
| 5,444,097 A | 8/1995 | Tkacik | |
| 7,208,200 B2 * | 4/2007 | Kools | 427/294 |
| 2004/0028875 A1 * | 2/2004 | Van Rijn et al. | 428/98 |
| 2008/0207822 A1 * | 8/2008 | Yeager et al. | 524/543 |

* cited by examiner

FOREIGN PATENT DOCUMENTS

| | | |
|---|---|---|
| JP | 06-166116 A | 6/1994 |
| JP | 2004-216230 A | 8/2004 |
| JP | 2005-146230 A | 6/2005 |
| JP | 2007-181813 A | 7/2007 |

OTHER PUBLICATIONS

International Search Report in PCT/JP2008/002749 dated Dec. 9, 2008.

*Primary Examiner* — David C Mellon
(74) *Attorney, Agent, or Firm* — Marshall, Gerstein & Borun LLP

(57) ABSTRACT

A dope solution for membrane production comprising polyethersulfone having high strength, high water permeability, a high rejecting ability and excellent contamination resistance, a separation membrane, and a process for producing the separation membrane are provided. The dope solution for membrane production contains a polyethersulfone and a solvent for thermally induced phase separation selected from the group consisting of 3-pyridinemethanol, 4-methyl-1,3-dioxolane-2-one, 4-benzylpiperidine, trimethyl phosphate, 1,3-dioxolane-2-one and mixtures thereof.

8 Claims, 8 Drawing Sheets

SEPARATION MEMBRANE COMPRISING POLYETHERSULFONE, PROCESS FOR PRODUCING THEREOF, AND DOPE SOLUTION FOR MEMBRANE PRODUCTION

CROSS-REFERENCE TO RELATED APPLICATIONS

This is the U.S. national phase application of International Application No. PCT/JP2008/002749, filed Sep. 30, 2008, which claims the benefit of Japanese patent application No. 2007-272481, filed Oct. 19, 2007, incorporated herein by reference in its entirety.

TECHNICAL FIELD

The present invention relates to a separation membrane comprising polyethersulfone, a process for production, and a dope solution for membrane production. More particularly, the present invention relates to a separation membrane comprising polyethersulfone, a method for producing thereof, and a dope solution for membrane production suited for use in the fields of water treatment involving beverage manufacturing, water purification treatment and waste water treatment, as well as medical field, food engineering field, and the like.

BACKGROUND ART

In recent years, separation membranes have been utilized for eliminating impurities in water as an alternative to conventional sand filtration or coagulating sedimentation process in the fields of water treatment involving beverage manufacturing, water purification treatment, waste water treatment and the like. Moreover, in the food engineering field, separation membranes have been utilized for the purpose of concentrating liquids, and separating and eliminating yeast etc., used in fermentation.

Since it is necessary that such separation membranes used in various ways can treat a large quantity of water in the water treatment fields, improvement of water permeability has been demanded. In addition, since a microbicide, an acid, an alkali, chlorine, a surfactant or the like is used for washing the separation membrane, chemical resistance properties have been required. Furthermore, in order to prevent contamination with any pathogenic microorganism or the like, the separation membranes are needed to have satisfactory separation characteristics and high physical strength such that the treated water is not contaminated with raw water. Thus, separation membranes are demanded to have excellent separation characteristics, chemical strength (chemical resistance), physical strength, contamination resistance, and permeability.

To meet such demands, separation membranes in which a polyvinylidene fluoride based resin is used, which has both chemical strength (chemical resistance) and physical strength have been employed (for example, Patent Document 1). However, the separation membranes in which a polyvinylidene fluoride based resin is used contain halogen molecules; therefore, there arises a problem of generating endocrine disrupting substances when the membranes are subjected to incineration disposal. Furthermore, since the polyvinylidene fluoride based resin is highly hydrophobic, there may also be a problem of rigid attachment of contaminating substances. Moreover, when a resin other than the polyvinylidene fluoride based resin, for example, a cellulose based resin is used, there arise problems of low chemical resistance and physical strength of the membrane.

In order to solve the problems of prior art as described above, production of a separation membrane using polyethersulfone that is superior in chemical resistance and mechanical strength has been investigated. However, a solvent applicable to polyethersulfone for use in a thermally induced phase separation method (TIPS method) capable of uniformly forming dense fine pores has not been known; therefore, film formation of polyethersulfone is not enabled unless a nonsolvent induced phase separation method (NIPS method) is performed according to the prior art.

However, the separation membrane of polyethersulfone produced by a nonsolvent induced separation method is accompanied by generation of macrovoids, and a uniform fine pore structure cannot be obtained, leading to inferior strength of the membrane. Therefore, various kinds of efforts are necessary for obtaining a practical applicable separation membrane, and thus the regulation method and quality control become difficult.

Patent Document 1: JP-A No. 2005-146230 (claim 4)

DISCLOSURE OF THE INVENTION

[Problems to be Solved by the Invention]

The present invention was made in view of the problems of the prior art described above, and an object of the invention is to provide a dope solution for membrane production which can produce a separation membrane having high strength, high water permeability, a high rejecting ability and excellent contamination resistance by a thermally induced phase separation method using polyethersulfone that is superior in terms of the chemical resistance, the mechanical strength and the like. Moreover, to provide a separation membrane produced using the dope solution for membrane production, and a process for producing the separation membrane is also an object of the invention.

[Means for Solving the Problems]

The dope solution for membrane production of the present invention is characterized by comprising polyethersulfone, and a solvent for thermally induced phase separation.

Since polyethersulfone is a polymer being superior in chemical resistance, and having high mechanical strength, it can improve the chemical resistance and mechanical strength of the separation membrane to be obtained. In addition, since polyethersulfone is accompanied by less smoke quantity and no generation of hazardous substance including halogen upon incineration, the separation membrane can be easily discarded after use.

The solvent for thermally induced phase separation dissolves 15 to 50% by weight of the aforementioned polyethersulfone based on the weight of the dope solution for membrane production at a temperature not lower than the phase separation temperature, and causing phase separation concurrently therewith at a temperature lower than the phase separation temperature.

The term "phase separation temperature" herein means a temperature that results in generation of a solid phase or liquid phase separated from a solution prepared by heating to dissolve polyethersulfone, when cooled to ordinary temperature. Moreover, the term "ordinary temperature" herein means a temperature of a solution without particularly heating or cooling the same, and specifically refers to a temperature of 0 to 40° C., and usually around 15 to 25° C. as specified in Japanese Pharmacopoeia.

The solvent for thermally induced phase separation may be selected from the group consisting of 3-pyridinemethanol, 4-methyl-1,3-dioxolane-2-one, 4-benzylpiperidine, trimethyl phosphate, 1,3-dioxolane-2-one (ethylene carbonate) and any mixture thereof.

The separation membrane of the present invention is characterized in that it is obtained by a thermally induced phase separation method using a dope solution for membrane production prepared by dissolving the polyethersulfone. When the separation membrane is a flat membrane, it is obtained by preparing the dope solution for membrane production by dissolving the polyethersulfone, and then discharging it from above the liquid level of a coagulation liquid or under the liquid level of a coagulation liquid to give a membranous form, followed by cooling. When the separation membrane is a hollow fiber membrane, it is obtained by preparing a dope solution for membrane production by dissolving the polyethersulfone, and then discharging it from above the liquid level of a coagulation liquid or under the liquid level of a coagulation liquid to give a hollow fibrous form, followed by cooling, and concurrently, discharging an internal diameter-maintaining agent into the center section of the hollow fiber.

In such a procedure, the internal diameter-maintaining agent does not dissolve the polyethersulfone at ordinary temperature, but dissolves the polyethersulfone at a temperature not lower than the phase separation temperature, and the aforementioned solvent for thermally induced phase separation may be also used as the internal diameter-maintaining agent under conditions that cause phase separation.

The process for producing the separation membrane of the present invention is characterized in that the separation membrane is obtained by a thermally induced phase separation method using the dope solution for membrane production prepared by dissolving polyethersulfone. The separation membrane in a flat membranous form is produced using a discharge nozzle by preparing a dope solution for membrane production by dissolving the polyethersulfone, and then discharging it from above the liquid level of a coagulation liquid or under the liquid level of a coagulation liquid to give a membranous form, followed by cooling. The hollow fibrous separation membrane is produced using a multi-discharge nozzle by preparing a dope solution for membrane production by dissolving the polyethersulfone, and then discharging it from above the liquid level of a coagulation liquid or under the liquid level of a coagulation liquid to give a hollow fibrous form, followed by cooling, and concurrently, discharging an internal diameter-maintaining agent from the center section of the multi-discharge nozzle into the center section of the hollow fiber.

[Effects of the Invention]

According to the dope solution for membrane production of the present invention, production of a separation membrane of polyethersulfone having high strength, high water permeability, a high rejecting ability and excellent contamination resistance is enabled by a thermally induced phase separation method. Therefore, when a separation membrane produced using this dope solution for membrane production is used, even though water containing organic matter contaminant such as humic acid, for example, is treated, lowering of the amount of water permeation can be inhibited, and thus a separation membrane having high contamination resistance can be provided. Accordingly, frequency of washing the separation membrane is decreased, and the product-life cycle is prolonged, whereby cost for water manufacture can be reduced.

BRIEF DESCRIPTION OF THE DRAWINGS

FIG. 2 (b) shows a bottom view illustrating an opening section of the multi-discharge nozzle shown in FIG. 1;

Figure 1:
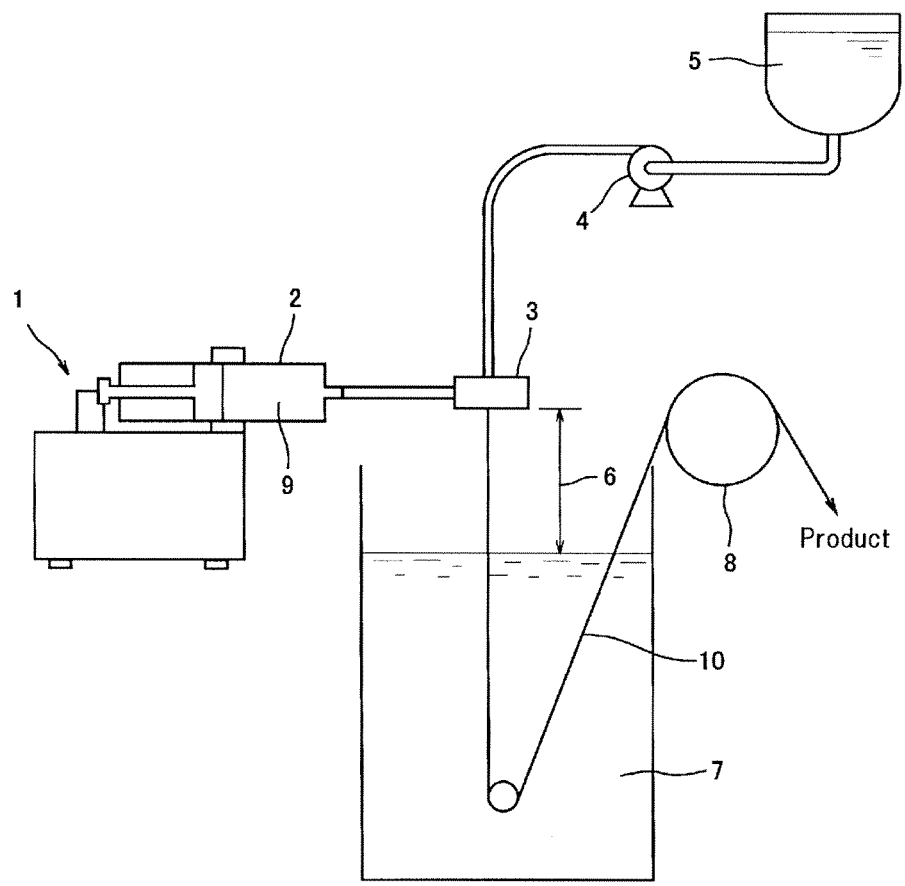
FIG. 1 shows a schematic configuration diagram illustrating a spinning apparatus for use in producing a hollow fiber membrane.

| [Description of Reference Numerals and Signs] | |
|---|---|
| 1 | supplying pump of dope solution for membrane production |
| 2 | heat dissolution bath |
| 3 | multi-discharge nozzle |
| 4 | supplying pump of internal diameter-maintaining agent |
| 5 | internal diameter-maintaining agent |
| 6 | air gap |
| 7 | coagulation liquid |
| 8 | winding unit |
| 9 | dope solution for membrane production |
| 10 | hollow fiber membrane |
| 11 | nozzle block |
| 12 | cavity |
| 13 | discharge opening |
| 14 | supplying tube of internal diameter-maintaining agent |
| 15 | spinning discharge opening |
| 16 | discharge opening of internal diameter-maintaining agent |
| 20 | hollow fiber membrane |
| 21 | water storage tank |
| 22 | pipe |
| 23 | roller pump |
| 24, 25 | pressure gauge |
| 26 | water drainage tank |
| 27, 28 | holder |
| 29 | pressure-regulating valve |

BEST MODE FOR CARRYING OUT THE INVENTION

Embodiments of the present invention will be explained with reference to the drawings. The dope solution for membrane production of the present invention comprises polyethersulfone represented by the chemical formula (1), and a solvent for thermally induced phase separation. In the dope solution for membrane production of the present invention, the polyethersulfone preferably has a molecular weight falling within the range of 25,000 to 70,000. The molecular weight not falling within this range is not preferred since production of a separation membrane may not be enabled.

[Chemical Formula 1]

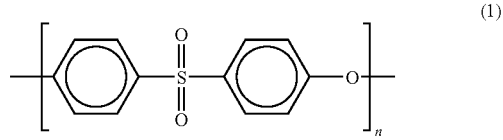

The concentration of polyethersulfone is 15 to 50% by weight, and preferably 15 to 35% by weight based on the weight of the dope solution for membrane production (100% by weight). When the concentration of polyethersulfone is less than the lower limit as indicated, a membrane having sufficient strength cannot be obtained. Whereas, the concentration exceeding the upper limit as above-indicated is not preferred since the pores having too small diameters are generated, and thus the membrane becomes more likely to have low permeability that necessitates an even higher pressure in separation.

The solvent for use in the dope solution for membrane production of the present invention dissolves the polyethersulfone at a temperature not lower than the phase separation temperature, and causing phase separation concurrently therewith at less than the phase separation temperature.

Examples of such a solvent for thermally induced phase separation include solvents presented in Table 1, and mixed solvents of two or more of these. When such a solvent is used, occurrence of thermal phase separation is facilitated, and therefore, a separation membrane having a uniform fine pore structure can be easily obtained.

10 with respect to varying concentrations. The solvents can be assessed as being capable of serving in obtaining a polyethersulfone separation membrane having a fine pore structure by employing a thermally induced phase separation method, as long as they exhibit the phase separation temperatures in this manner.

By appropriately selecting the concentration of polyethersulfone or the solvent in the dope solution for membrane production of the present invention, or by controlling the cooling rate of the dope solution for membrane production, the fine pore size on the surface can be regulated in the range of 0.01 μm to 10 μm, while maintaining sufficient number of fine pores on the surface.

The separation membrane of the present invention is obtained using the aforementioned dope solution for membrane production, by employing the thermally induced phase separation method as described above. When the separation membrane of the present invention is a flat membrane, it can be produced by discharging the dope solution for membrane production from above the liquid level of a coagulation liquid or under the liquid level of a coagulation liquid to give a membranous form, followed by cooling.

When the separation membrane of the present invention is a hollow fiber membrane, it can be obtained by discharging the dope solution for membrane production, which was prepared by dissolving the polyethersulfone, from above the liquid level of a coagulation liquid or under the liquid level of a coagulation liquid to give a hollow fibrous form followed by

TABLE 1

| | | Solvent | | | |
|---|---|---|---|---|---|
| No. | Solvent name | Boiling point [° C.] | Water solubility | Appearance | CAS No. |
| 1 | trimethyl phosphate | 196 | easily soluble | colorless liquid | 512-56-1 |
| 2 | 1,3-dioxolane-2-one (ethylene carbonate) | 238 | easily soluble | white solid | 96-49-1 |
| 3 | pyridine-3-methanol | 266 | extremely soluble | slightly pale yellow to yellowish brown liquid | 100-55-0 |
| 4 | 4-methyl-1,3-dioxolane-2-one | 241 | easily soluble | colorless liquid | 108-32-7 |
| 5 | 4-benzylpiperidine | 279 | hardly soluble | colorless to light yellow | 31252-42-3 |

Figure 11:
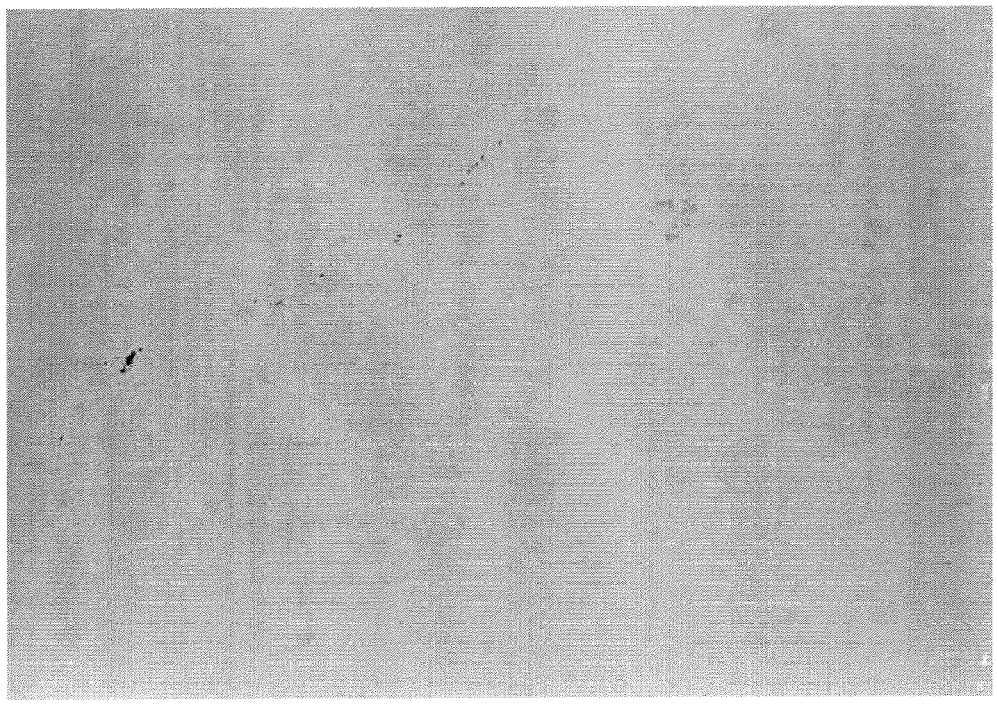
FIG. 11 shows a micrograph illustrating a uniformly dissolved dope solution for membrane production.
Figure 12:
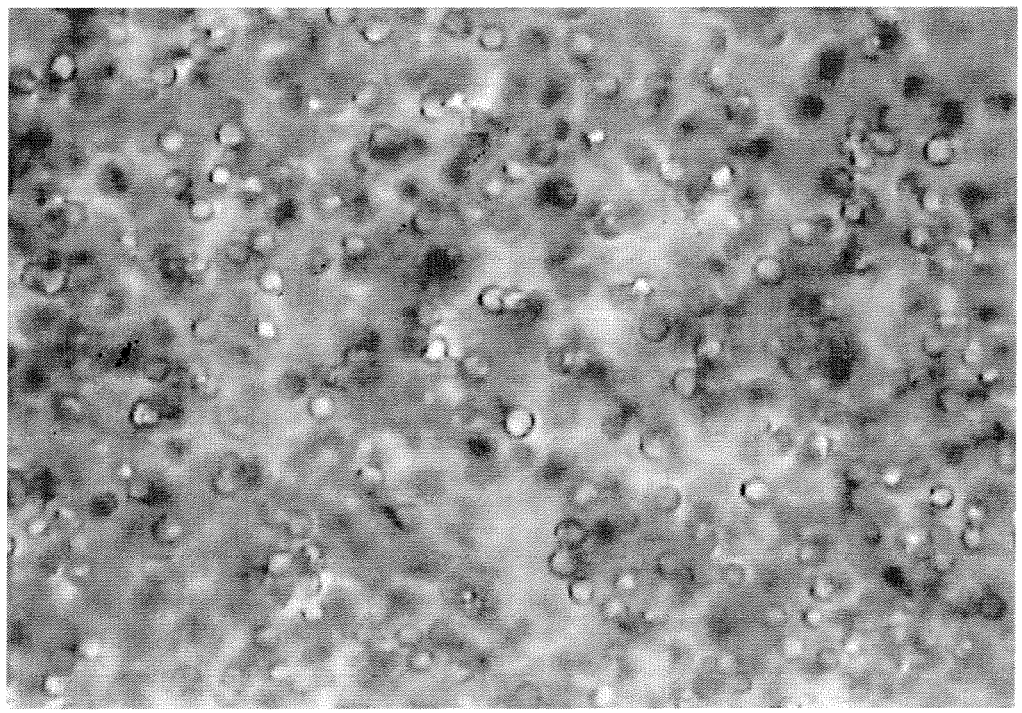
FIG. 12 shows a micrograph illustrating a dope solution for membrane production in which phase separation is caused.

FIG. 6 to FIG. 10 show results of measurement of the phase separation temperature of the solvents shown in Table 1 with respect to polyethersulfone. These results are based on the measurement as follows using a light microscope equipped with a hot stage. First, a solution of polyethersulfone (manufactured by BASF, E-6020P, molecular weight: 51,000) is prepared, followed by elevating the temperature until the polyethersulfone is uniformly dissolved, and immediately thereafter an image is taken with a light microscope. FIG. 11 shows a micrograph of a homogenous solution of polyethersulfone. Next, this solution is left to stand on the hot stage, and observed with a microscope for the state of the solution as the temperature drops. Then, a temperature at which areas having low density of the polymer start to be generated as shown in FIG. 12 is determined, which temperature is defined as a phase separation temperature. The data of thus determined phase separation temperatures are plotted on FIG. 6 to FIG.

cooling, and concurrently discharging an internal diameter-maintaining agent into the center section of the hollow fiber.

Herein, the internal diameter-maintaining agent according to the present invention does not dissolve the polyethersulfone described above at ordinary temperature, but dissolves the polyethersulfone at a temperature not lower than the phase separation temperature. Specific examples of the internal diameter-maintaining agent include compounds presented in the above Table 1, as well as compounds presented in Table 2 below. Furthermore, gasses can be also used as the internal diameter-maintaining agent. The internal diameter-maintaining agent is generally heated in a similar manner to the dope solution for membrane production, and supplied to the center section of the hollow fiber at a temperature range in this operation of approximately the same as that of the dope solution for membrane production.

TABLE 2

Internal Diameter-Maintaining Agent (excluding the solvents shown in Table 1)

| No. | Solvent name | boiling point (° C.) | water solubility | Appearance | CAS No. |
|---|---|---|---|---|---|
| 1 | dimethyl phthalate | 282 | slightly soluble | colorless to slightly pale yellow liquid | 131-11-3 |
| 2 | 4-benzylpyridine | 287 | insoluble | colorless to yellowish brown liquid | 2116-65-6 |
| 3 | m-xylene-α,α'-diamine | 270 | Easily soluble | slightly pale yellow to yellowish brown liquid | 1477-55-0 |
| 4 | 1-acetonaphthone | 302 | insoluble | slightly pale yellow to yellow liquid | 941-98-0 |
| 5 | 2-pyrrolidone | 245 | easily soluble | white to slightly pale yellow solid or liquid | 616-45-5 |
| 6 | 6-hexanolactone | 235 | easily soluble | colorless to yellowish liquid | 502-44-3 |
| 7 | 3,4-dimethoxybenzyl alcohol | 300 | easily soluble | colorless to pale yellow liquid | 93-03-8 |
| 8 | 1-naphthaldehyde | 292 | insoluble | colorless to yellowish brown liquid | 66-77-3 |
| 9 | o-nitroanisole | 272 | insoluble | pale yellow to yellowish brown liquid | 91-23-6 |
| 10 | 4-methylquinoline | 262 | slightly soluble | colorless to yellowish brown liquid | 491-35-0 |
| 11 | 2-(2-aminoethylamino)ethanol | 245 | easily soluble | colorless liquid | 111-41-1 |
| 12 | dipropylenetriamine | 235 | easily soluble | colorless to slightly pale yellow liquid | 56-18-8 |
| 13 | N-(3-aminopropyl)morpholine | 222 | miscible | colorless to slightly pale yellow liquid | 123-00-2 |
| 14 | 2-(1-piperazinyl)ethylamine | 222 | easily soluble | colorless to pale yellow liquid | 140-31-8 |
| 15 | diethylenetriamine | 207 | easily soluble | colorless liquid | 111-40-0 |
| 16 | hexamethylphosphoric triamide | 230 | insoluble | colorless to light yellow liquid | 680-31-9 |
| 17 | sulfolane | 285 | easily soluble | colorless to yellowish brown liquid | 126-33-0 |
| 18 | o-methoxyphenol | 205 | slightly soluble | white to slightly pale yellow solid, colorless to slightly pale yellow liquid | 90-05-1 |
| 19 | p-ethoxybenzaldehyde | 255 | hardly soluble | yellowish to brown liquid | 10031-82-0 |
| 20 | Γ-butyrolactone | 204 | miscible | colorless liquid | 96-48-0 |
| 21 | o-aminoacetophenone | 250 | hardly soluble | colorless to yellowish brown liquid | 551-93-9 |
| 22 | N-phenylpiperazine | 286 | extremely soluble | colorless to yellow liquid | 92-54-6 |
| 23 | triethylenetetramine | 278 | easily soluble | colorless to slightly pale yellow liquid | 112-24-3 |
| 24 | 2-acetylpyrrole | 220 | insoluble | white to brownish solid | 1072-83-9 |
| 25 | benzophenone | 305 | insoluble | white solid | 119-61-9 |
| 26 | acetanilide | 304 | slightly soluble | white solid | 103-84-4 |
| 27 | m-anilinophenol | 340 | hardly soluble | white to light brown solid | 101-18-8 |
| 28 | p-ethylphenol | 215 | hardly soluble | white to brown solid, colorless to brown liquid | 123-07-9 |
| 29 | dipropylsulfone | 270 | slightly soluble | colorless to yellowish brown liquid | 598-03-8 |
| 30 | imidazole | 257 | easily soluble | white to yellowish solid | 288-32-4 |
| 31 | o-hydroxyacetophenone | 213 | hardly soluble | colorless to yellowish liquid | 118-93-4 |
| 32 | 2-methoxy-4-methylphenol | 221 | hardly soluble | colorless to yellowish liquid | 93-51-6 |
| 33 | 1,2,3,4-tetrahydroquinoline | 249 | insoluble | yellowish to yellow liquid | 635-46-1 |
| 34 | 2,6-dichlorophenol | 218 | hardly soluble | white to slightly light brown solid | 87-65-0 |
| 35 | coumarin | 291 | insoluble | white to slightly light brown solid | 91-64-5 |
| 36 | o-nitrobenzyl alcohol | 270 | insoluble | brownish to brown solid | 612-25-9 |
| 37 | o-hydroxybiphenyl | 275 | hardly soluble | white solid | 90-43-7 |
| 38 | cinnamic alcohol | 250 | hardly soluble | white to yellowish solid | 104-54-1 |
| 39 | 3-bromoaniline | 251 | hardly soluble | extremely pale yellow to dark red brown liquid | 591-19-5 |

The coagulation liquid in the present invention does not dissolve the polyethersulfone. Specific examples of the coagulation liquid include compounds presented in Table 3. The coagulation liquid is used for cooling the discharged dope solution for membrane production, and its temperature is usually ordinary temperature or lower. When the dope solution for membrane production is brought into contact with the coagulation liquid and cooled, particles are generated by way of the phase separation as described above and as shown in FIG. 12, and the solvent inside the particles is separated from high concentration areas of the polymer, leading to formation of a separation membrane having a fine pore structure. Since the size of the particles becomes smaller as the cooling rate is greater, the size of the fine pores will be also smaller as the cooling rate is greater.

TABLE 3

Coagulation Liquid

| No. | Solvent name | boiling point (° C.) | water solubility | Appearance | CAS No. |
|---|---|---|---|---|---|
| 1 | 2-ethylhexyl phthalate | 385 | slightly soluble | colorless liquid | 117-81-7 |
| 2 | dibutyl phthalate | 340 | slightly soluble | colorless to yellowish liquid | 84-74-2 |
| 3 | dibutyl fumarate | 281 | hardly soluble | colorless liquid | 105-75-9 |
| 4 | dibutyl maleate | 280 | hardly soluble | colorless liquid | 105-76-0 |
| 5 | bis(2-ethylhexyl) sebacate | 377 | insoluble | colorless to yellowish liquid | 122-62-3 |
| 6 | dibutyl sebacate | 345 | insoluble | colorless to yellowish liquid | 109-43-3 |
| 7 | 1-dodecanethiol | 280 | hardly soluble | colorless liquid | 112-55-0 |
| 8 | squalene | 285 | hardly soluble | colorless to slightly pale yellow liquid | 111-02-4 |
| 9 | tributyrin | 305 | hardly soluble | colorless to slightly pale yellow liquid | 60-01-5 |
| 10 | tridecane | 235 | insoluble | colorless liquid | 629-50-5 |
| 11 | pentadecane | 270 | hardly soluble | colorless liquid | 629-62-9 |
| 12 | tetradecane | 253 | hardly soluble | colorless liquid | 629-59-4 |
| 13 | 1-hexadecene | 274 | insoluble | colorless liquid | 629-73-2 |
| 14 | 1-decanol | 230 | hardly soluble | colorless liquid | 112-30-1 |

TABLE 3-continued

Coagulation Liquid

| No. | Solvent name | boiling point (° C.) | water solubility | Appearance | CAS No. |
|---|---|---|---|---|---|
| 15 | oleic acid | 286 | insoluble | colorless to yellow liquid | 112-80-1 |
| 16 | 1-tetradecene | 250 | insoluble | colorless liquid | 1120-36-1 |
| 17 | 1-phenyloctane | 261 | insoluble | colorless to yellowish liquid | 2189-60-8 |
| 18 | n-dodecane | 216 | insoluble | colorless liquid | 112-40-3 |
| 19 | 1-dodecene | 215 | insoluble | colorless liquid | 112-41-4 |
| 20 | 1-nonanol | 215 | insoluble | colorless liquid | 143-08-8 |
| 21 | diethyl fumarate | 218 | insoluble | colorless to slightly pale yellow liquid | 623-91-6 |
| 22 | bis(2-ethylhexyl) azelate | 376 | insoluble | colorless to slightly pale yellow liquid | 103-24-2 |
| 23 | 2-ethylhexyl acrylate | 215 | insoluble | colorless to slightly pale yellow liquid | 103-11-7 |
| 24 | n-valeric acid | 186 | extremely soluble | colorless to slightly pale yellow liquid | 109-52-4 |
| 25 | isopropyl myristate | 188 | insoluble | colorless to slightly pale yellow liquid | 110-27-0 |
| 26 | N,n-butylethanolamine | 200 | soluble | colorless to yellowish liquid | 111-75-1 |
| 27 | butyl oleate | 225 | hardly soluble | colorless to slightly pale yellow liquid | 142-77-8 |
| 28 | dipropylene glycol | 232 | hardly soluble | colorless liquid | 25265-71-8 |
| 29 | 2-undecanol | 228 | slightly soluble | colorless liquid | 1653-30-1 |
| 30 | 1-phenylnonane | 282 | insoluble | colorless to yellowish liquid | 1081-77-2 |
| 31 | bis(2-butoxyethyl) ether | 256 | hardly soluble | colorless liquid | 112-73-2 |
| 32 | 1-octadecene | 315 | insoluble | colorless liquid | 112-88-9 |
| 33 | dodecyl bromide | 280 | insoluble | colorless to slightly pale yellow liquid | 143-15-7 |
| 34 | n-hexadecane | 287 | hardly soluble | colorless liquid | 544-76-3 |
| 35 | n-heptadecane | 303 | hardly soluble | white solid or colorless liquid | 629-78-7 |
| 36 | butyl phthalate butyl glycolate | 345 | slightly soluble | colorless to pale yellow liquid | 85-70-1 |
| 37 | n-octadecanol | 335 | insoluble | white solid | 112-92-5 |
| 38 | eicosane | 344 | insoluble | colorless to slightly pale yellow solid | 112-95-8 |
| 39 | n-nonadecane | 330 | hardly soluble | white to slightly pale yellow solid | 629-92-5 |
| 40 | di-2-propanolamine | 249 | insoluble | white solid | 110-97-4 |
| 41 | 1-undecanol | 250 | insoluble | colorless to slightly pale yellow liquid | 112-42-5 |
| 42 | 2-undecanone | 23 | insoluble | colorless to slightly pale yellow liquid | 112-12-9 |
| 43 | 2-octanol | 179 | hardly soluble | colorless liquid | 123-96-6 |
| 44 | 1-heptanal | 176 | hardly soluble | colorless to slightly pale yellow liquid | 111-71-7 |
| 45 | 1-hexadecanol | 179 | insoluble | white solid | 36653-82-4 |
| 46 | stearic acid | 386 | insoluble | white solid | 57-11-4 |
| 47 | triisopropanolamine | 300 | extremely soluble | colorless liquid | 78-96-6 |
| 48 | methyl palmitate | 415 | insoluble | white solid | 112-39-0 |
| 49 | octadecane | 280 | hardly soluble | white solid or colorless liquid | 593-45-3 |
| 50 | glycerin | 290 | soluble | colorless liquid | 56-81-5 |
| 51 | water | | | | |

In producing the hollow fiber membrane employing the thermally induced phase separation method, a spinning apparatus as shown in FIG. 1 is generally used. The spinning apparatus shown in the figure includes a supplying pump of dope solution for membrane production 1 having a heat dissolution bath 2 for storing a dope solution for membrane production 9 in which polyethersulfone is uniformly dissolved, and this supplying pump of dope solution for membrane production 1 supplies the dope solution for membrane production 9 to a multi-discharge nozzle 3. In addition, an internal diameter-maintaining agent 5 is supplied to the multi-discharge nozzle 3 from a supplying pump of internal diameter-maintaining agent 4.

Figure 2:
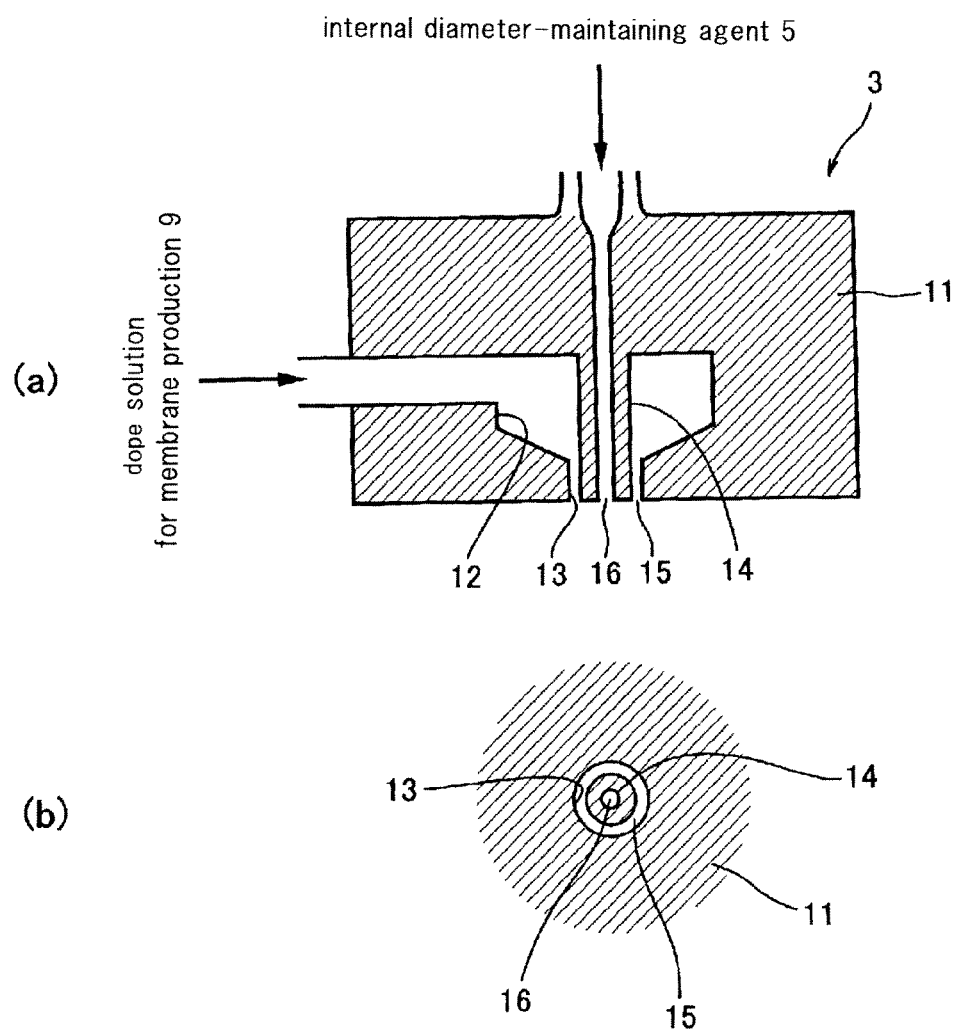
FIG. 2 (a) shows a cross-sectional view illustrating a multi-discharge nozzle shown in FIG. 1.

FIG. 2 (a) shows a cross-sectional view of the multi-discharge nozzle 3, whereas FIG. 2 (b) shows a bottom view of a central region in the FIG. 2 (a). As shown in FIG. 2 (a), the multi-discharge nozzle 3 has a nozzle block 11, and a cavity 12 is provided in the nozzle block 11. To this cavity 12 the dope solution for membrane production 9 is supplied from the supplying pump of dope solution for membrane production 1. Also, the cavity 12 opens to the inferior face of the nozzle block 11 as a discharge opening 13, and the discharge opening 13 is circular in a plan view as shown in FIG. 2 (b). Furthermore, a supplying tube of internal diameter-maintaining agent 14 connected to the supplying pump of internal diameter-maintaining agent 4 (see, FIG. 1) is disposed in the cavity 12. This supplying tube of internal diameter-maintaining agent 14 reaches the center section of the discharge opening 13 through the cavity 12, and as shown in FIG. 2 (b), is fixed such that the center of the supplying tube of internal diameter-maintaining agent 14 fits the center of the discharge opening 13. According to such a configuration, a spinning discharge opening 15 is formed between the discharge opening 13 and the supplying tube of internal diameter-maintaining agent 14. In addition, a discharge opening of internal diameter-maintaining agent 16 for supplying the internal diameter-maintaining agent 5 by the aforementioned supplying pump of internal diameter-maintaining agent 4 is formed at a central part of the supplying tube of internal diameter-maintaining agent 14. Therefore, this multi-discharge nozzle 3 enables the internal diameter-maintaining agent 5 to be discharged by means of the discharge opening of internal diameter-maintaining agent 16, into the center section of the dope solution for membrane production 9 discharged to give a hollow fibrous form from the spinning discharge opening 15. Accordingly, spinning of the hollow fiber membrane is enabled.

As shown in FIG. 1, the dope solution for membrane production 9 and the internal diameter-maintaining agent 5 discharged from the multi-discharge nozzle 3 reach into the coagulation liquid 7. In this stage, the distance from the inferior face of the multi-discharge nozzle 3 to the liquid level of the coagulation liquid 7, i.e., an air gap 6, which correlates with the cooling rate of the dope solution for membrane production, is in general, preferably no greater than 30 mm, and may be no greater than 0 mm. In other words, the inferior face of the multi-discharge nozzle 3 may exist below the liquid level of the coagulation liquid 7. By adjusting the air gap 6, the cooling rate of the dope solution for membrane production can be controlled, and thus the pore size and the number of fine pores on the surface formed at the hollow fiber membrane can be regulated.

The hollow fiber membrane 10 formed by thermally induced phase separation in the coagulation liquid 7 is wound by a winding unit 8 (see, FIG. 1). In this step, the winding speed of the winding unit 8 may vary depending on the amount of supplying the dope solution for membrane production, the size of the spinning discharge opening 15 and the like, but is adequately 0.15 to 0.45 m/sec, in general. As the amount of supplying the dope solution for membrane production increases, and also as the size of the spinning discharge opening 15 is greater, it is necessary to accelerate the winding speed at the winding unit 8.

Physical properties of the hollow fiber membrane obtained as in the foregoing are approximately as follows:
pore size: no greater than 1 μm;
water permeability: no less than 300 L/m$^2$/hr/atm;
maximum stress: no less than 3.0 MPa;
maximum distortion: no less than 30%; and
modulus of elasticity: no less than 50 MPa.

Figure 3:
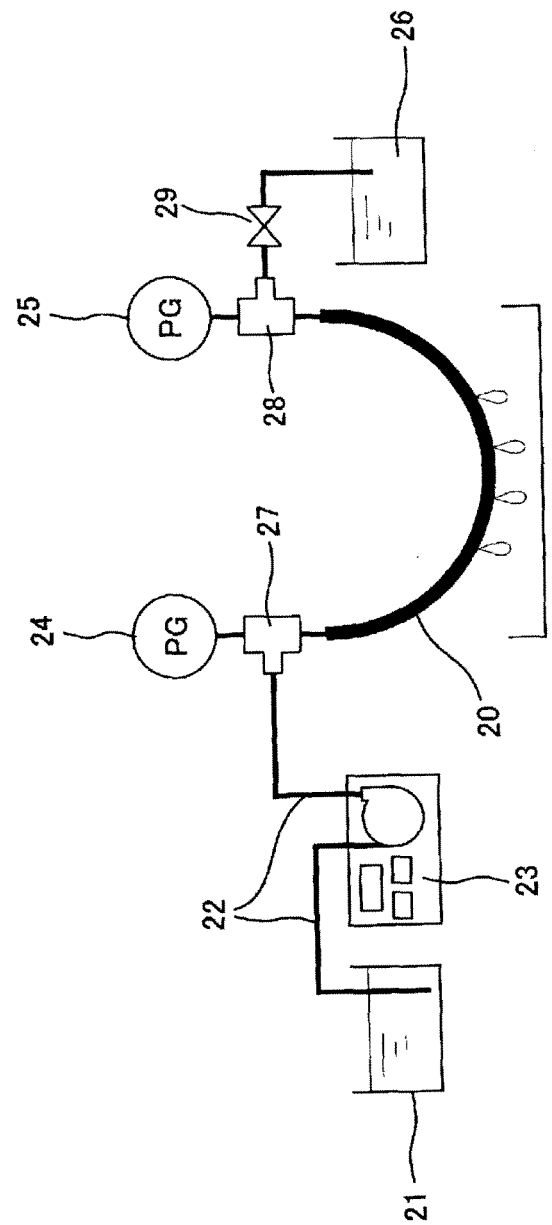
FIG. 3 shows a schematic view illustrating an apparatus for determining water permeability of a hollow fiber membrane.

For the determination, the water permeability of the hollow fiber membrane is measured by an apparatus schematically illustrated in FIG. 3. As shown in the figure, both ends of the hollow fiber membrane 20 are fixed to two holders 27 and 28, and ion exchanged water is discharged from the holder 27 delivered from the water storage tank 21 through a pipe 22 by means of a roller pump 23 to the central part of the hollow fiber membrane 20. The down stream holder 28 is connected to a pressure-regulating valve 29 for regulating the pressure of the ion exchanged water in the hollow fiber membrane 20, whereas the ion exchanged water exited from the pressure-regulating valve 29 is discharged into the water drainage tank 26. Moreover, pressure gauges 24 and 25 are connected to the two holders 27 and 28, respectively. The water permeability is determined using this apparatus by supplying ion exchanged water to the hollow fiber membrane 20.

EXAMPLES

Example 1

Figure 4:
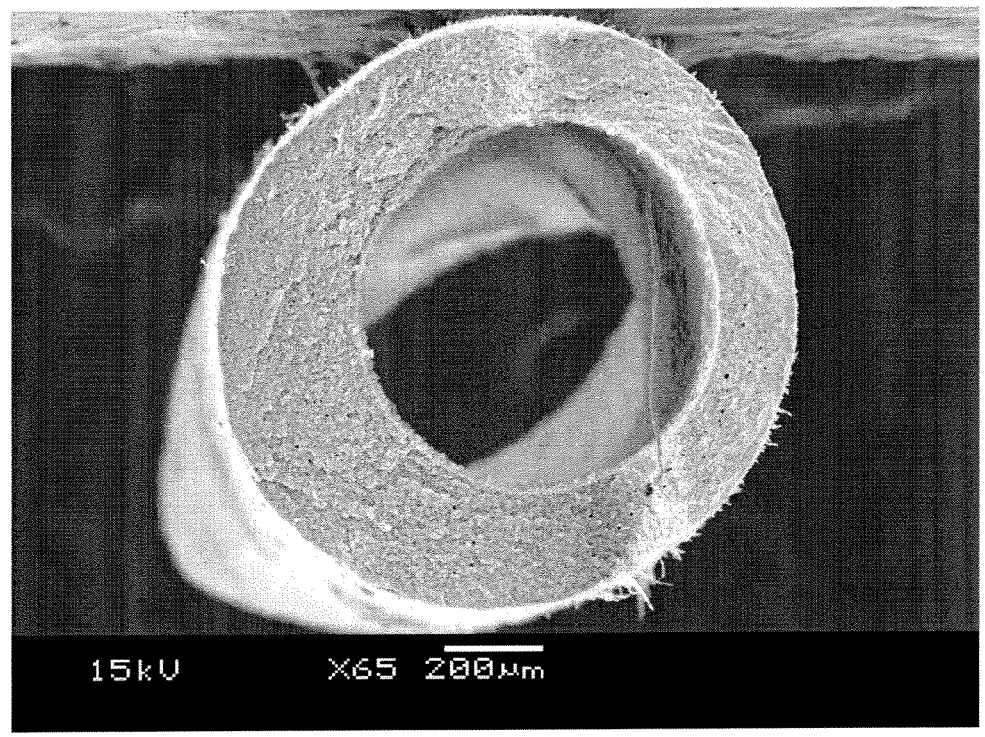
FIG. 4 shows a scanning electron micrograph illustrating a cross section of a hollow fiber membrane obtained in Example 1.

A dope solution for membrane production was obtained by adding polyethersulfone (manufactured by BASF, E-6020P, molecular weight: 51,000) to 3-pyridinemethanol to give a concentration of 20% by weight, and completely dissolving by heating at 135° C. while stirring. Next, a hollow fiber membrane was produced with a spinning apparatus shown in FIG. 1 and FIG. 2, using 3-pyridinemethanol as an internal diameter-maintaining agent, and using water as a coagulation liquid. This step was carried out under conditions involving: the air gap of 0 mm; temperature of the coagulation liquid of 0° C.; temperature of the internal diameter-maintaining agent of 135° C. being the same as the temperature of the dope solution for membrane production; the diameter of the spinning discharge opening of 1.58 mm; the diameter of the discharge opening of internal diameter-maintaining agent of 0.83 mm; and the winding speed of the winding unit of 0.17 m/s. A scanning electron micrograph of a cross section of the hollow fiber membrane produced in this manner is shown in FIG. 4. In addition, physical properties of this hollow fiber membrane are shown in Table 4.

With respect to maximum stress, maximum distortion and modulus of elasticity presented in Table 4, measurements were carried out with AUTOGRAPH AGS-J, manufactured by Shimadzu Corporation, using twenty hollow fiber membranes having a length of 50 mm, and their average values are shown. Further, with respect to water permeability, the amount of water permeation of ion exchanged water under a condition of a temperature of 25° C. was measured on five hollow fiber membranes having a length of 200 mm, respectively with an apparatus shown in FIG. 3, and their average values are shown.

Example 2

Figure 5:
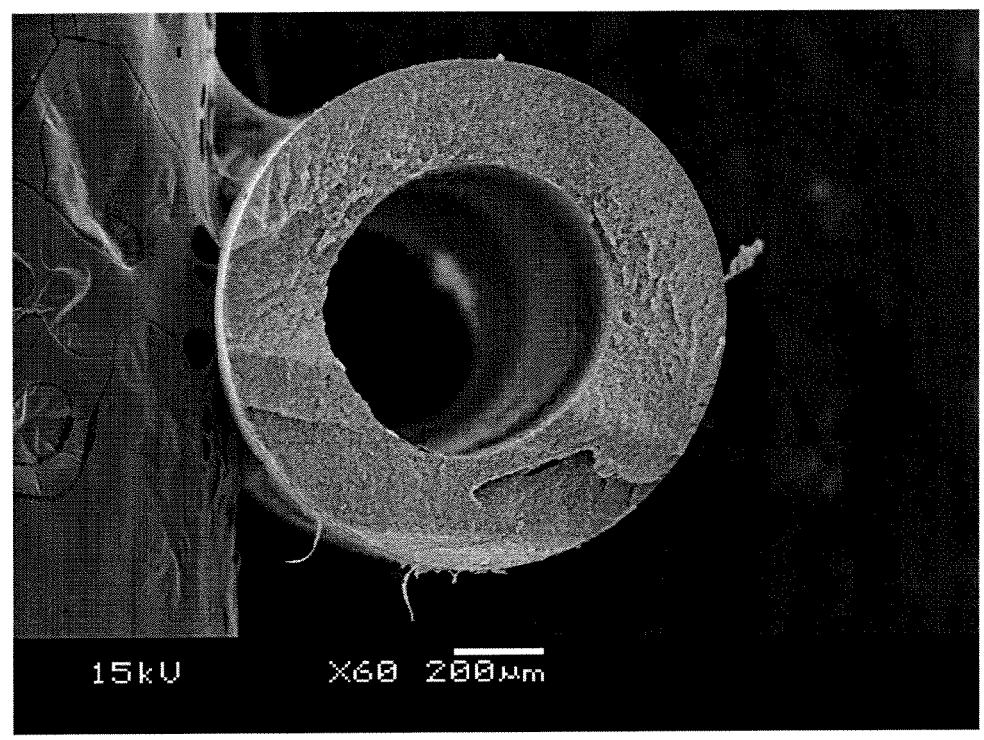
FIG. 5 shows a scanning electron micrograph illustrating a cross section of a hollow fiber membrane obtained in Example 2.
Figure 6:
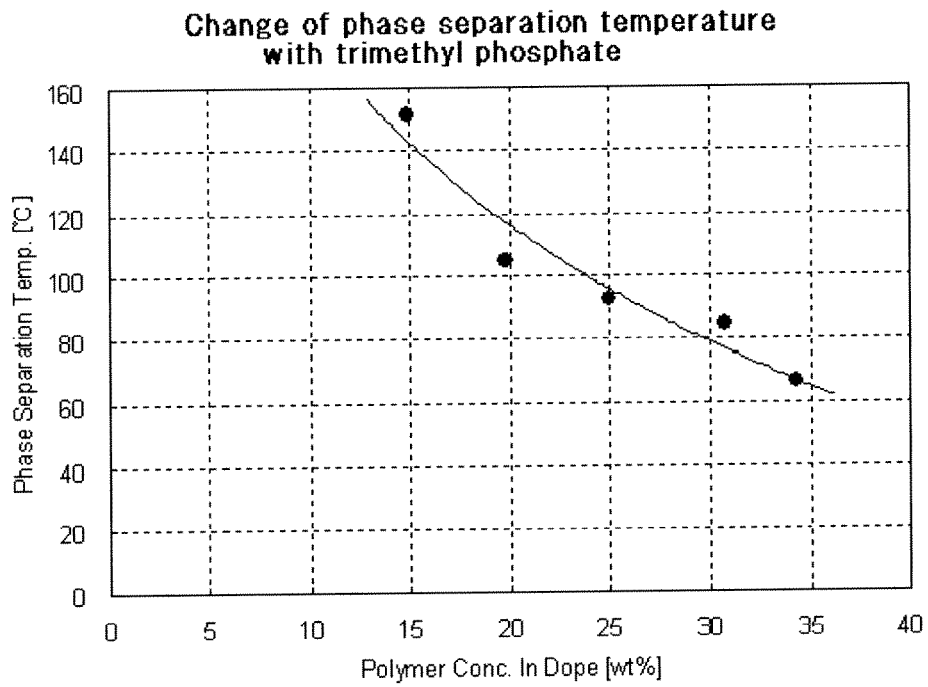
FIG. 6 shows a view illustrating a phase separation temperature of trimethyl phosphate.
Figure 7:
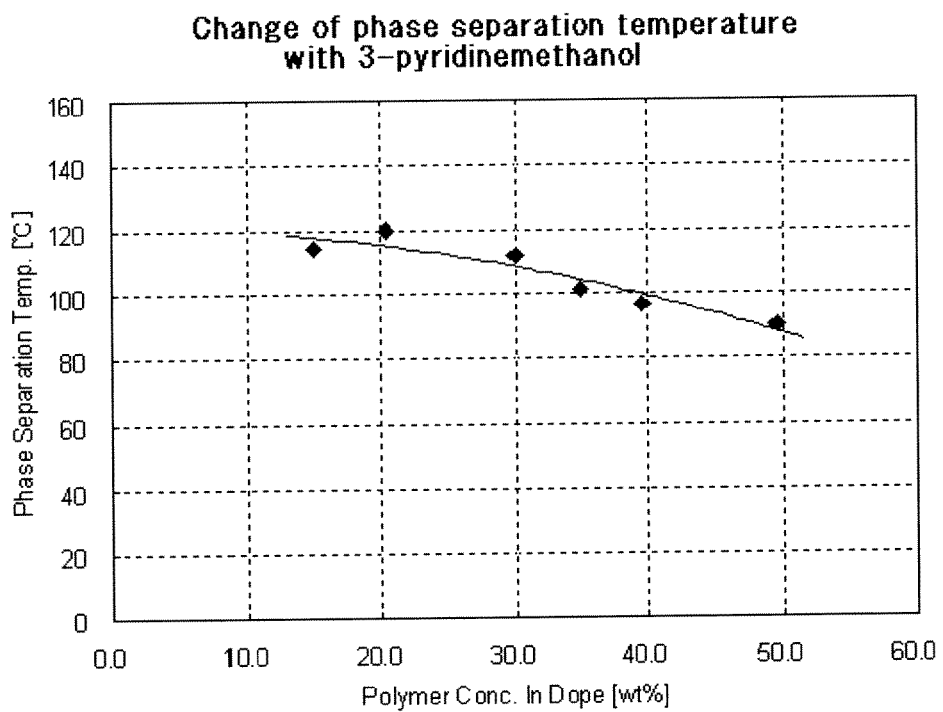
FIG. 7 shows a view illustrating a phase separation temperature of 3-pyridinemethanol.
Figure 8:
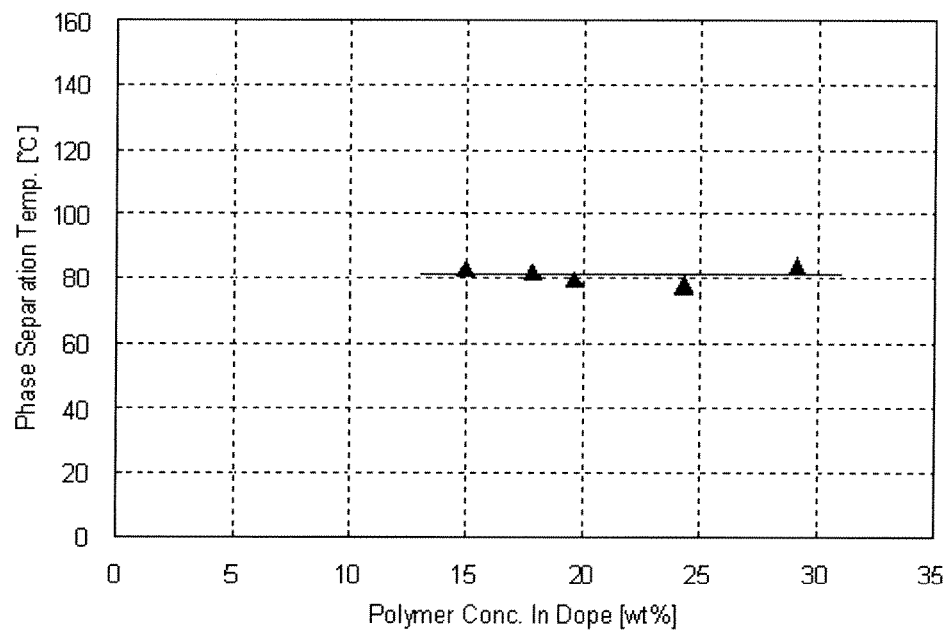
FIG. 8 shows a view illustrating a phase separation temperature of 4-methyl-1,3-dioxolane-2-one.
Figure 9:
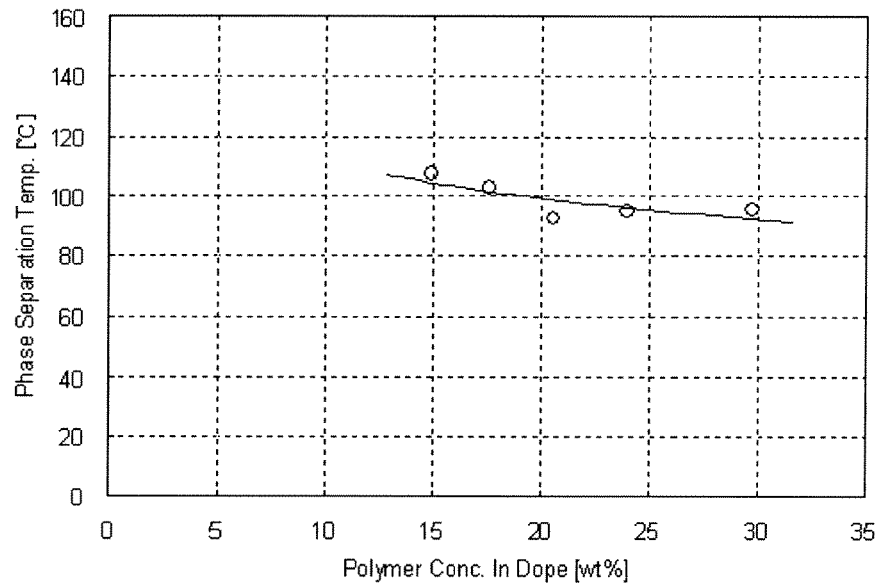
FIG. 9 shows a view illustrating a phase separation temperature of 4-benzylpiperidine.
Figure 10:
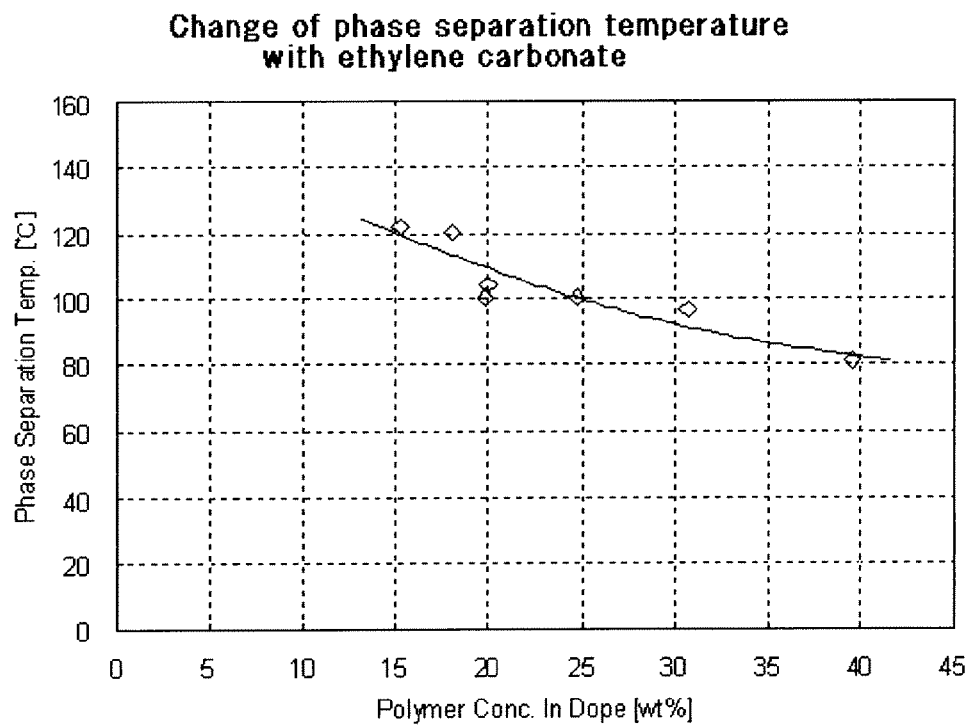
FIG. 10 shows a view illustrating a phase separation temperature of 1,3-dioxolane-2-one.

A dope solution for membrane production was obtained by adding polyethersulfone (manufactured by BASF, E-6020P, molecular weight: 51,000) to 3-pyridinemethanol to give a concentration of 20% by weight, and completely dissolving by heating at 135° C. while stirring. Next, a hollow fiber membrane was produced with a spinning apparatus shown in FIG. 1 and FIG. 2, using 3-pyridinemethanol as an internal diameter-maintaining agent, and using water as a coagulation liquid. This step was carried out under conditions involving: the air gap of 5 mm; temperature of the coagulation liquid of 25° C.; temperature of the internal diameter-maintaining agent of 135° C. being the same as the temperature of the dope solution for membrane production; the diameter of the spinning discharge opening of 1.58 mm; the diameter of the discharge opening of internal diameter-maintaining agent of 0.83 mm; and the winding speed of the winding unit of 0.25 m/s. A scanning electron micrograph of a cross section of the hollow fiber membrane produced in this manner is shown in FIG. 5. In addition, physical properties of this hollow fiber membrane were determined in a similar manner to Example 1, and the results are shown in Table 4.

TABLE 4

| Physical properties of hollow fiber membrane | Example 1 | Example 2 |
|---|---|---|
| Water permeability (L/m$^2$/h/atm) | 3825 | 710 |
| Maximum stress (MPa) | 3.53 | 3.84 |
| Maximum distortion (%) | 46.57 | 51.61 |
| Modulus of elasticity (MPa) | 66.06 | 78.08 |

[Industrial Applicability]

According to the dope solution for membrane production of the present invention, a separation membrane comprising polyethersulfone having high strength, high water permeability, a high rejecting ability and excellent contamination resistance is obtained. Therefore, the present invention is applicable in fields such as water supply business, food engineering field, medical field such as artificial dialysis treatments, and the like.

The invention claimed is:

1. A dope solution for membrane production comprising a polyethersulfone, and 3-pyridinemethanol for thermally induced phase separation.

2. A process for producing a separation membrane, wherein the dope solution for membrane production according to claim 1 is used to obtain a separation membrane by a thermally induced phase separation method.

3. The process for producing a separation membrane according to claim 2, which is a process for producing a separation membrane in a flat membranous form, the process comprising: discharging the dope solution for membrane production from above a liquid level of a coagulation liquid or into a coagulation liquid to give a membranous form, followed by cooling.

4. The process for producing a separation membrane according to claim 2, which is a process for producing a hollow fibrous separation membrane, the process comprising: discharging the dope solution for membrane production from above a liquid level of a coagulation liquid or into a coagulation liquid using a multi-discharge nozzle to give a hollow fibrous form, followed by cooling, and concurrently, discharging an internal diameter-maintaining agent from a center section of the multi-discharge nozzle into the center section of the hollow fiber.

5. The process for producing a separation membrane according to claim 4, wherein the internal diameter-maintaining agent does not dissolve the polyethersulfone at ordinary temperature, but dissolves the polyethersulfone at a temperature not lower than the phase separation temperature.

6. The process for producing a separation membrane according to claim 5, wherein the internal diameter-maintaining agent is selected from the group consisting of 3-pyridinemethanol, 4-methyl-1,3-dioxolane-2-one, 4-benzylpiperidine, trimethyl phosphate, 1,3-dioxolane-2-one, dimethyl phthalate, 4-benzylpyridine, m-xylene-α,α'-diamine, 1-acetonaphthone, 2-pyrrolidone, 6-hexanolactone, 3,4-dimethoxybenzyl alcohol, 1-naphthaldehyde, o-nitroanisole, 4-methylquinoline, 2-(2-aminoethylamino)ethanol, dipropylenetriamine, N-(3-aminopropyl)morpholine, 2-(1-piperazinyl)ethylamine, diethylenetriamine, hexamethylphosphoric triamide, sulfolane, o-methoxyphenol, p-ethoxybenzaldehyde, γ-butyrolactone, o-aminoacetophenone, N-phenylpiperazine, triethylenetetramine, 2-acetylpyrrole, benzophenone, acetanilide, m-anilinophenol, p-ethylphenol, dipropylsulfone, imidazole, o-hydroxyacetophenone, 2-methoxy-4-methylphenol, 1,2,3,4-tetrahydroquinoline, 2,6-dichlorophenol, coumarin, o-nitrobenzyl alcohol, o-hydroxybiphenyl, cinnamic alcohol, 3-bromoaniline and mixtures thereof.

7. The process for producing a separation membrane according to claim 3, wherein the coagulation liquid does not dissolve polyethersulfone.

8. The process for producing a separation membrane according to claim 3, wherein the coagulation liquid is selected from the group consisting of water, 2-ethylhexyl phthalate, dibutyl phthalate, dibutyl fumarate, dibutyl maleate, bis(2-ethylhexyl) sebacate, dibutyl sebacate, 1-dodecanethiol, squalene, tributyrin, tridecane, pentadecane, tetradecane, 1-hexadecene, 1-decanol, oleic acid, 1-tetradecene, 1-phenyloctane, n-dodecane, 1-dodecene, 1-nonanol, diethyl fumarate, bis(2-ethylhexyl) azelate, 2-ethylhexyl acrylate, n-valeric acid, isopropyl myristate, N-n-butylethanolamine, butyl oleate, dipropylene glycol, 2-undecanol, 1-phenylnonane (n-nonylbenzene), bis(2-butoxyethyl) ether, 1-octadecene, dodecyl bromide, n-hexadecane, n-heptadecane, butyl phthalate butyl glycolate, n-octadecanol, eicosane, n-nonadecane, di-2-propanolamine, 1-undecanol, 2-undecanone, 2-octanol, 1-heptanal, 1-hexadecanol, stearic acid, triisopropanolamine, methyl palmitate, octadecane, glycerin and mixtures thereof.

* * * * *